(12) United States Patent  
Ramey

(10) Patent No.: US 9,041,260 B2
(45) Date of Patent: May 26, 2015

(54) COOLING SYSTEM AND METHOD FOR AN ELECTRONIC MACHINE

(75) Inventor: James J. Ramey, Fortville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 495 days.

(21) Appl. No.: 13/178,757

(22) Filed: Jul. 8, 2011

(65) Prior Publication Data

US 2013/0009493 A1 Jan. 10, 2013

(51) Int. Cl.
| | |
|---|---|
| *H02K 9/19* | (2006.01) |
| *H02K 5/20* | (2006.01) |
| *H02K 9/00* | (2006.01) |
| *H02K 9/193* | (2006.01) |

(52) U.S. Cl.
CPC *H02K 5/20* (2013.01); *H02K 9/193* (2013.01); *H02K 9/19* (2013.01)

(58) Field of Classification Search
CPC ............ H02K 9/19; H02K 9/20; H02K 5/20; H02K 9/193
USPC .......................... 310/52, 54, 59, 112, 58, 201
IPC ...................................... H02K 9/00, 9/20, 5/20
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 4,959,570 A * | 9/1990 | Nakamura et al. | ............... 310/54 |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,372,213 A * | 12/1994 | Hasebe et al. | ............... 180/65.6 |
| 5,519,269 A | 5/1996 | Lindberg | |
| 5,616,973 A | 4/1997 | Khazanov | |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |

(Continued)

FOREIGN PATENT DOCUMENTS

| | | | |
|---|---|---|---|
| JP | 05-103445 A | 4/1993 | |
| JP | 05-292704 A | 11/1993 | |

(Continued)

OTHER PUBLICATIONS

International Search Report, mailed Jul. 31, 2012.

(Continued)

*Primary Examiner* — John K Kim
(74) *Attorney, Agent, or Firm* — Greenberg Traurig, LLP

(57) ABSTRACT

Embodiments of the invention provide an electric machine module including an electric machine which can include a stator assembly. The stator assembly can include stator end turns. Some embodiments can provide a housing at least partially enclosing the electric machine and the housing can at least partially define a machine cavity. Further, at least one baffle can be coupled to the housing at a region near the stator end turns, so that the at least one baffle surrounds a portion of a perimeter of the stator end turns.

14 Claims, 14 Drawing Sheets

(56) References Cited

U.S. PATENT DOCUMENTS

| | | |
|---|---|---|
| 6,011,332 A | 1/2000 | Umeda et al. |
| 6,069,424 A | 5/2000 | Colello et al. |
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,537 B1 | 12/2001 | Arita |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measagi |
| 6,559,572 B2 | 5/2003 | Nakamura |
| 6,579,202 B2 * | 6/2003 | El-Antably et al. ........... 475/159 |
| 6,743,135 B2 * | 6/2004 | Klemen et al. .................... 475/5 |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,919,890 B2 * | 4/2011 | Taketsuna ........................ 310/54 |
| 7,939,975 B2 | 5/2011 | Saga et al. |
| 7,952,240 B2 * | 5/2011 | Takenaka et al. ............... 310/54 |
| 8,067,865 B2 | 11/2011 | Savant |
| 8,068,327 B2 | 11/2011 | Seifert et al. |
| 8,269,383 B2 * | 9/2012 | Bradfield ........................ 310/58 |
| 8,597,001 B2 * | 12/2013 | Saari et al. ................. 417/423.8 |
| 8,629,586 B2 * | 1/2014 | Minemura et al. ............... 310/54 |
| 2002/0074868 A1 * | 6/2002 | Ishida ............................. 310/54 |
| 2003/0222519 A1 | 12/2003 | Bostwick |
| 2004/0036367 A1 | 2/2004 | Denton et al. |
| 2004/0189110 A1 | 9/2004 | Ide |
| 2004/0195929 A1 | 10/2004 | Oshidari |
| 2005/0012423 A1 * | 1/2005 | Yasuhara et al. ............... 310/201 |
| 2005/0023266 A1 | 2/2005 | Ueno et al. |
| 2005/0023909 A1 | 2/2005 | Cromas |
| 2005/0188532 A1 * | 9/2005 | Kato et al. ....................... 29/606 |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063592 A1 * | 3/2007 | Pashnik et al. ................... 310/54 |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0223557 A1 | 9/2008 | Fulton et al. |
| 2009/0121562 A1 * | 5/2009 | Yim ................................ 310/54 |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0045125 A1 * | 2/2010 | Takenaka et al. ............... 310/54 |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2010/0264760 A1 * | 10/2010 | Matsui et al. ................... 310/54 |
| 2011/0050141 A1 | 3/2011 | Yeh et al. |
| 2011/0084561 A1 * | 4/2011 | Swales et al. ................... 310/54 |
| 2011/0101700 A1 | 5/2011 | Stiesdal |
| 2011/0109095 A1 | 5/2011 | Stiesdal |
| 2011/0156509 A1 * | 6/2011 | Minemura et al. .............. 310/54 |
| 2013/0009493 A1 * | 1/2013 | Ramey ............................ 310/43 |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

(56) References Cited

OTHER PUBLICATIONS

International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 9, 2012.
International Search Report completed Apr. 20, 2012.
International Search Report completed Mar. 8, 2012.
international Search Report completed Apr. 24, 2012.

* cited by examiner

COOLING SYSTEM AND METHOD FOR AN ELECTRONIC MACHINE

BACKGROUND

Conventional methods for cooling an electric machine include spraying or dispersing a coolant directly onto the electric machine. The coolant is often dispersed onto stator end turns near an upper portion of the electric machine. The coolant can cool the electric machine as it drips down the stator end turns and pools near a lower portion of the electric machine. The pooled coolant must be maintained at a specific level within the lower portion of the electric machine in order to help cool the stator end turns near the lower portion of the electric machine.

SUMMARY

Embodiments of the invention provide an electric machine module including an electric machine which can include a stator assembly. The stator assembly can include stator end turns. Some embodiments can provide a housing at least partially enclosing the electric machine and the housing can at least partially define a machine cavity. Further, at least one baffle can be coupled to the housing at a region near the stator end turns, so that the at least one baffle surrounds a portion of a perimeter of the stator end turns.

Some embodiments of the invention provide a method for cooling an electric machine including providing an electric machine which includes a stator assembly. The stator assembly can include stator end turns. Some embodiments can include providing a housing at least partially enclosing the electric machine. The housing can at least partially define a machine cavity and can include a generally lower region. In some embodiments, baffles can be coupled to the housing substantially within the generally lower region near the stator end turns, so that the baffles surround a portion of a perimeter of the stator end turns and a coolant can be introduced into the machine cavity. Some embodiments provide a portion of the coolant can circulate through the machine cavity toward the generally lower region so that some of the portion of the coolant contacts the baffles to at least partially aid in cooling the electric machine.

Some embodiments of the invention provide an electric machine module including an electric machine which can include a stator assembly. The stator assembly can include stator end turns. Some embodiments can provide a housing at least partially enclosing the electric machine and the housing can include a generally lower region. Some embodiments can provide that baffles can be coupled to the housing substantially within the generally lower region near the stator end turns, and the baffles can include being formed from a substantially non-conductive material and can surround a portion of a perimeter of the stator end turns.

DETAILED DESCRIPTION

Figure 1:
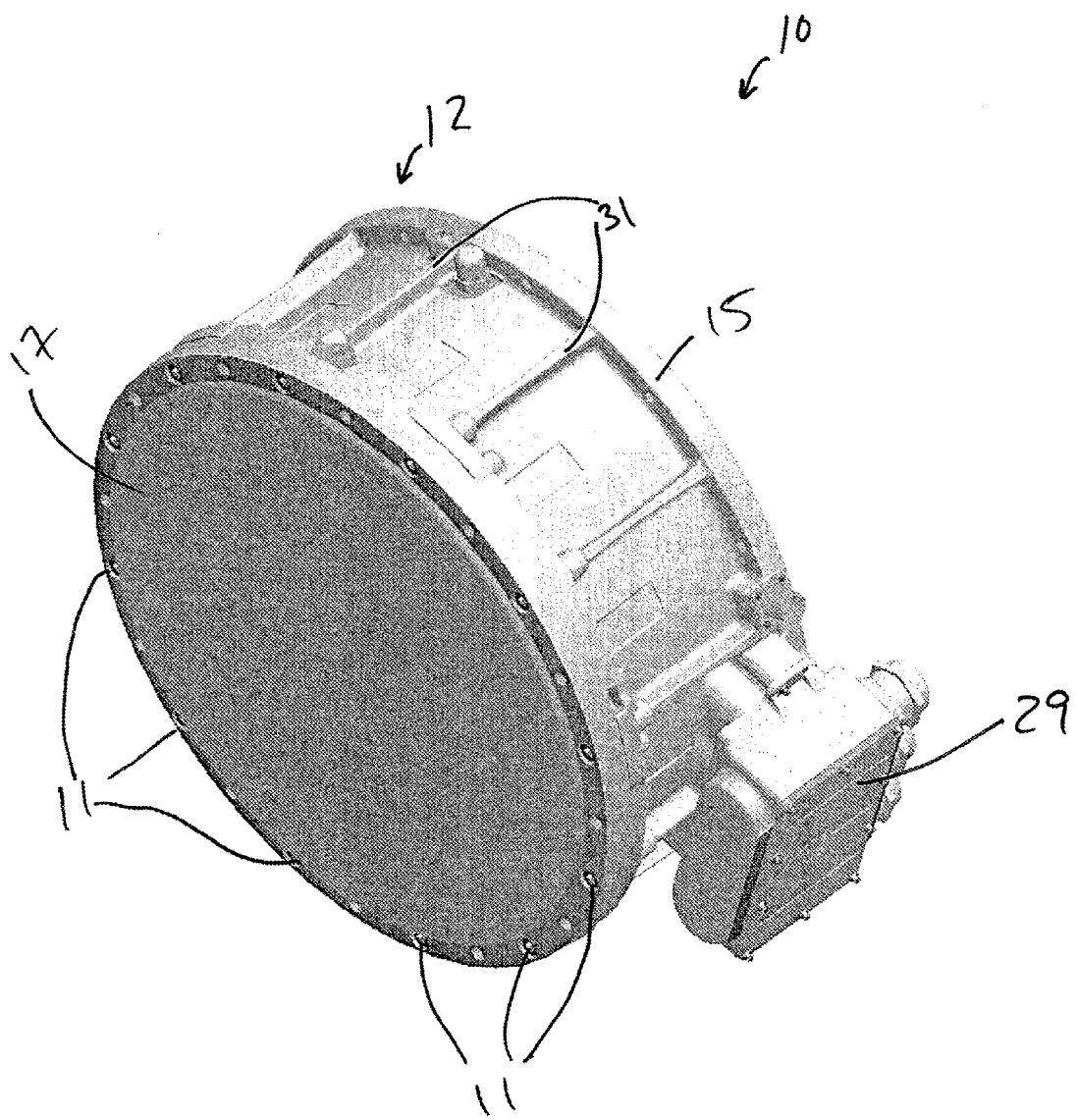
FIG. 1 is a perspective view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
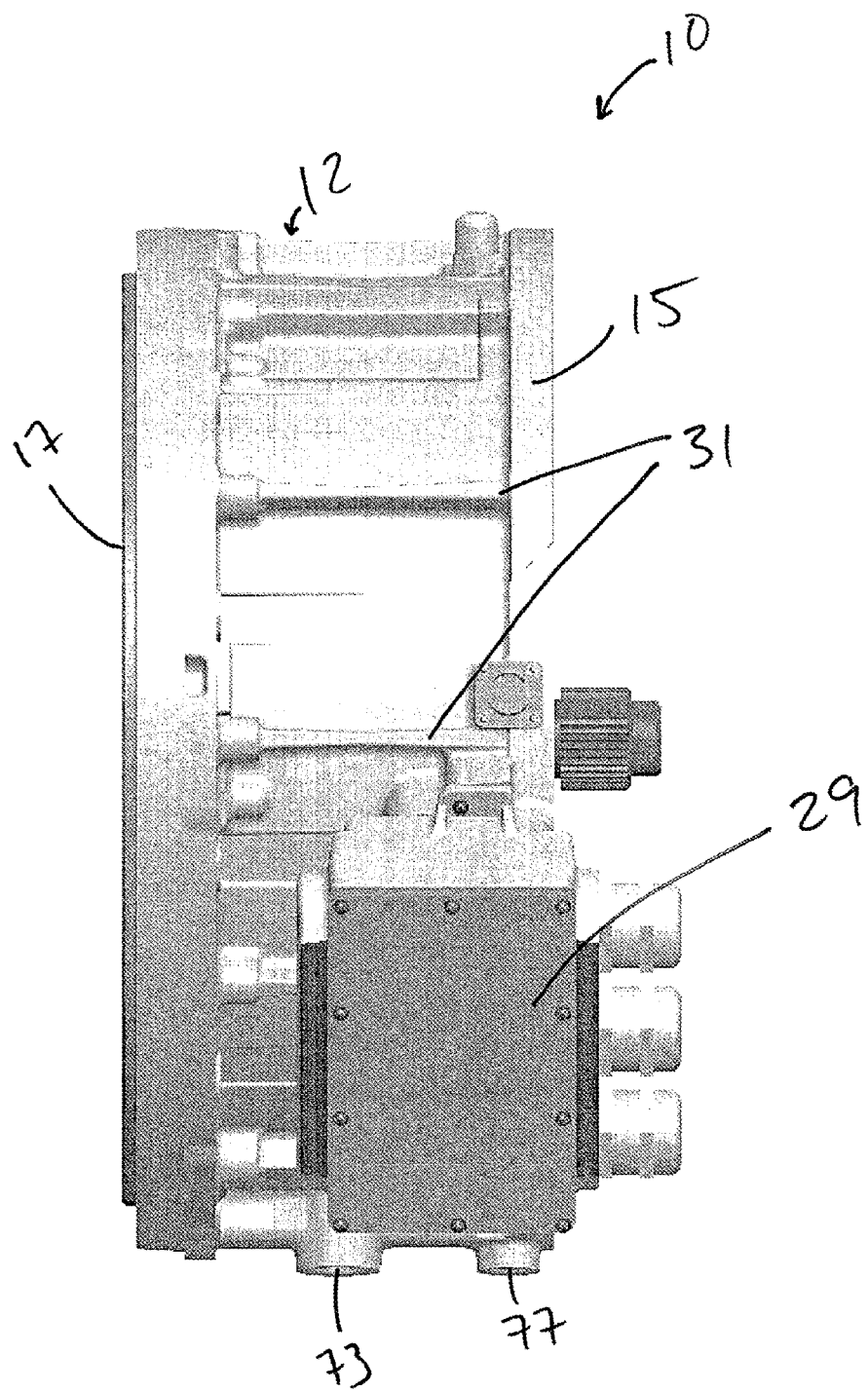
FIG. 2 is a side view of the electric machine module of FIG. 1.
Figure 3:
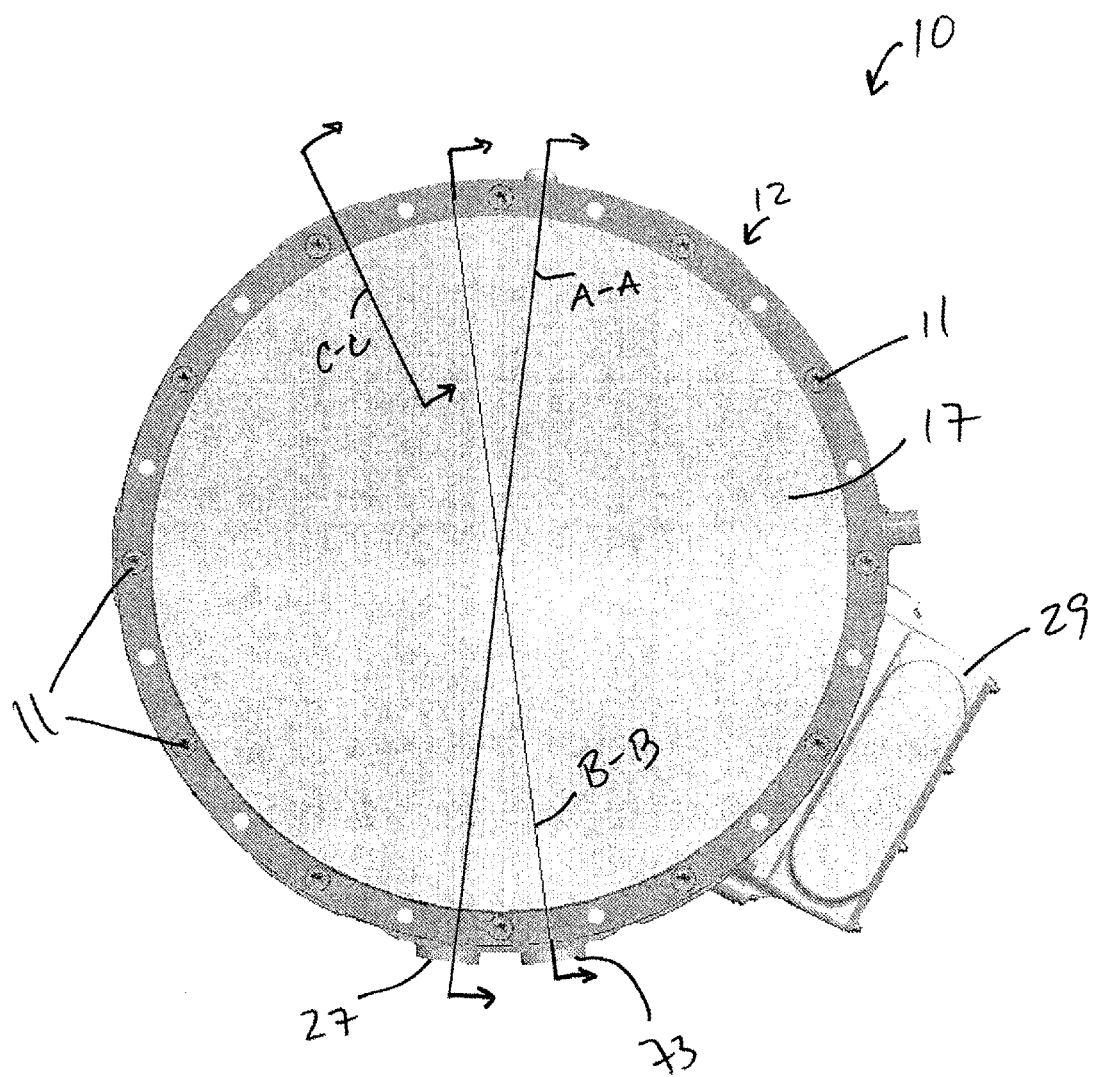
FIG. 3 is a front view of the electric machine module of FIG. 1.
Figure 4:
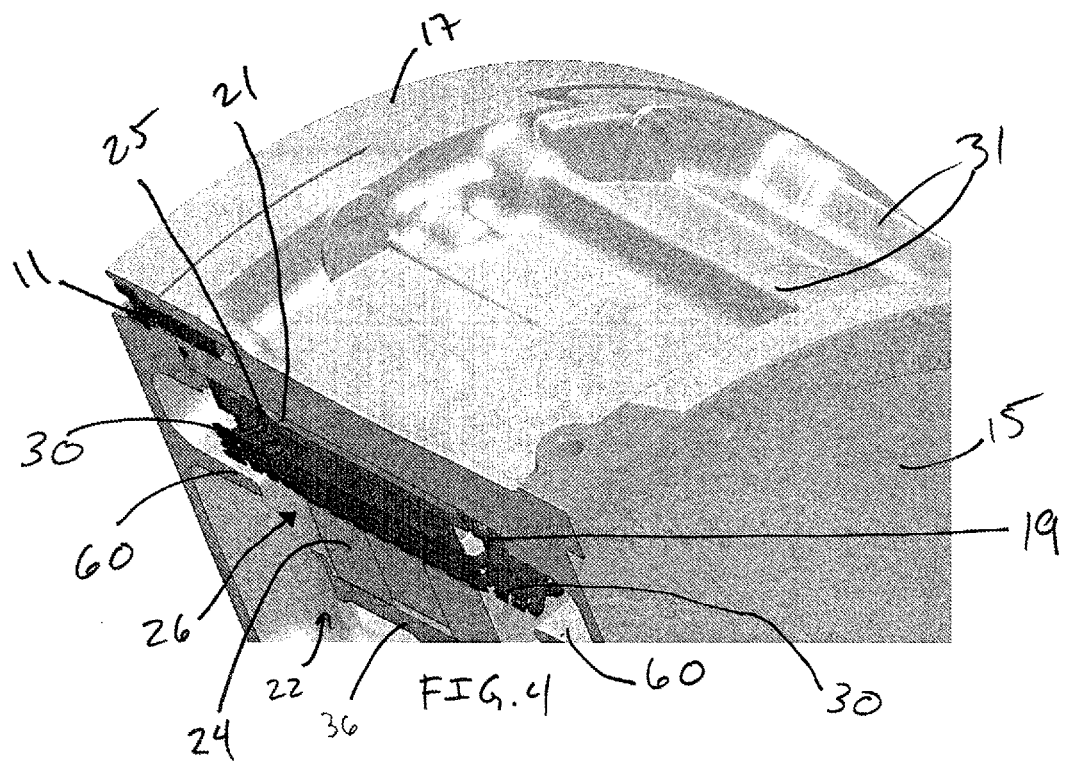
FIG. 4 is a perspective cross-sectional view of the electric machine module of FIG. 1.
Figure 5:
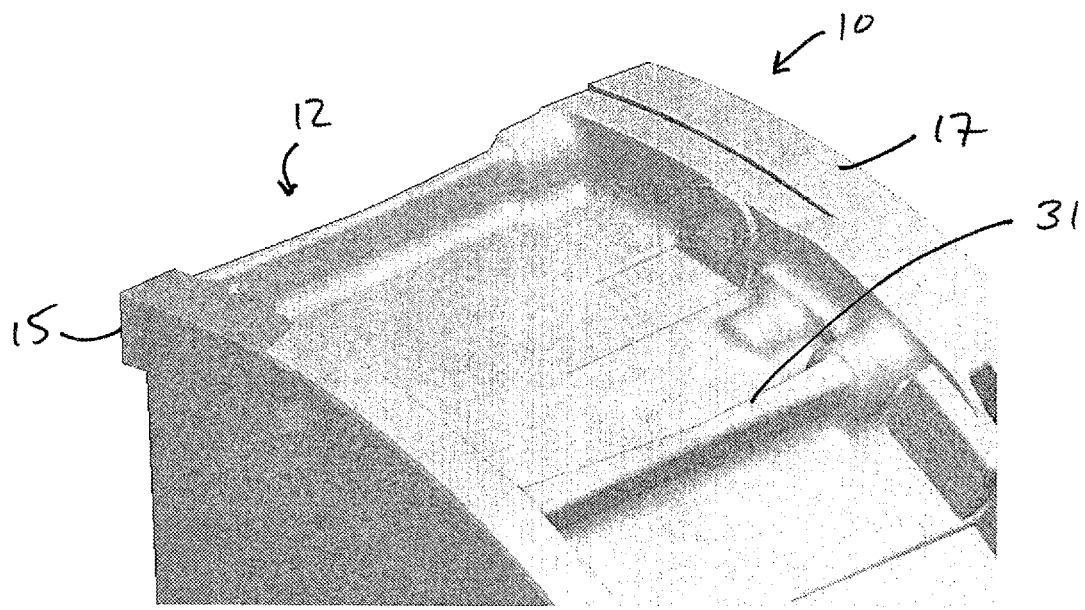
FIG. 5 is a rear view of the perspective cross-sectional view of FIG. 4.

FIGS. 1-3 illustrate portions of an electric machine module 10 according to one embodiment of the invention. The electric machine module 10 can comprise a housing 12 and electric connections 29. Additionally, in some embodiments, the housing 12 can included ribbed structures 31, which can partially provide structural support for the housing 12.

Figure 6:
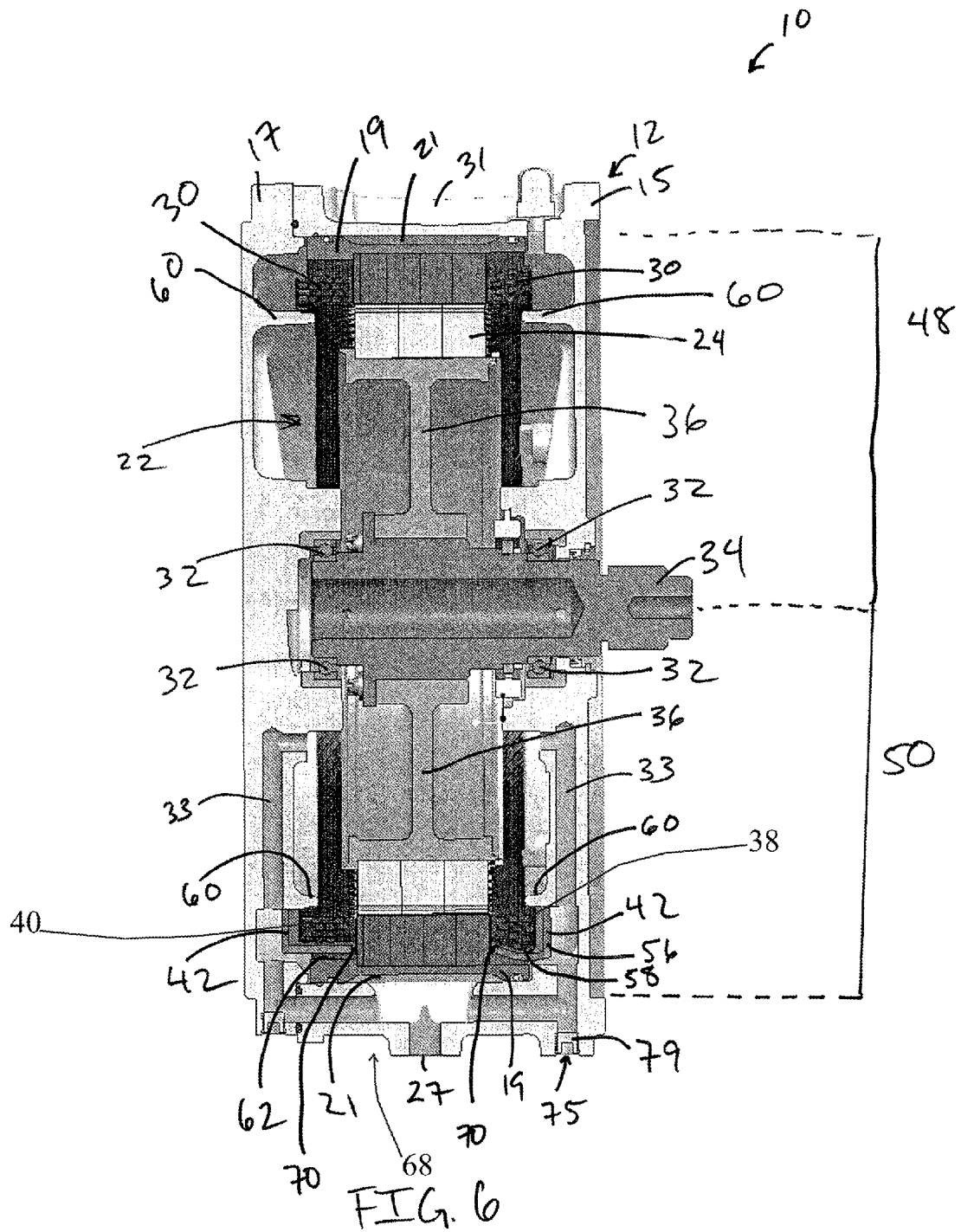
FIG. 6 is a cross-sectional view of the electric machine module of FIG. 3 along line A-A.
Figure 7:
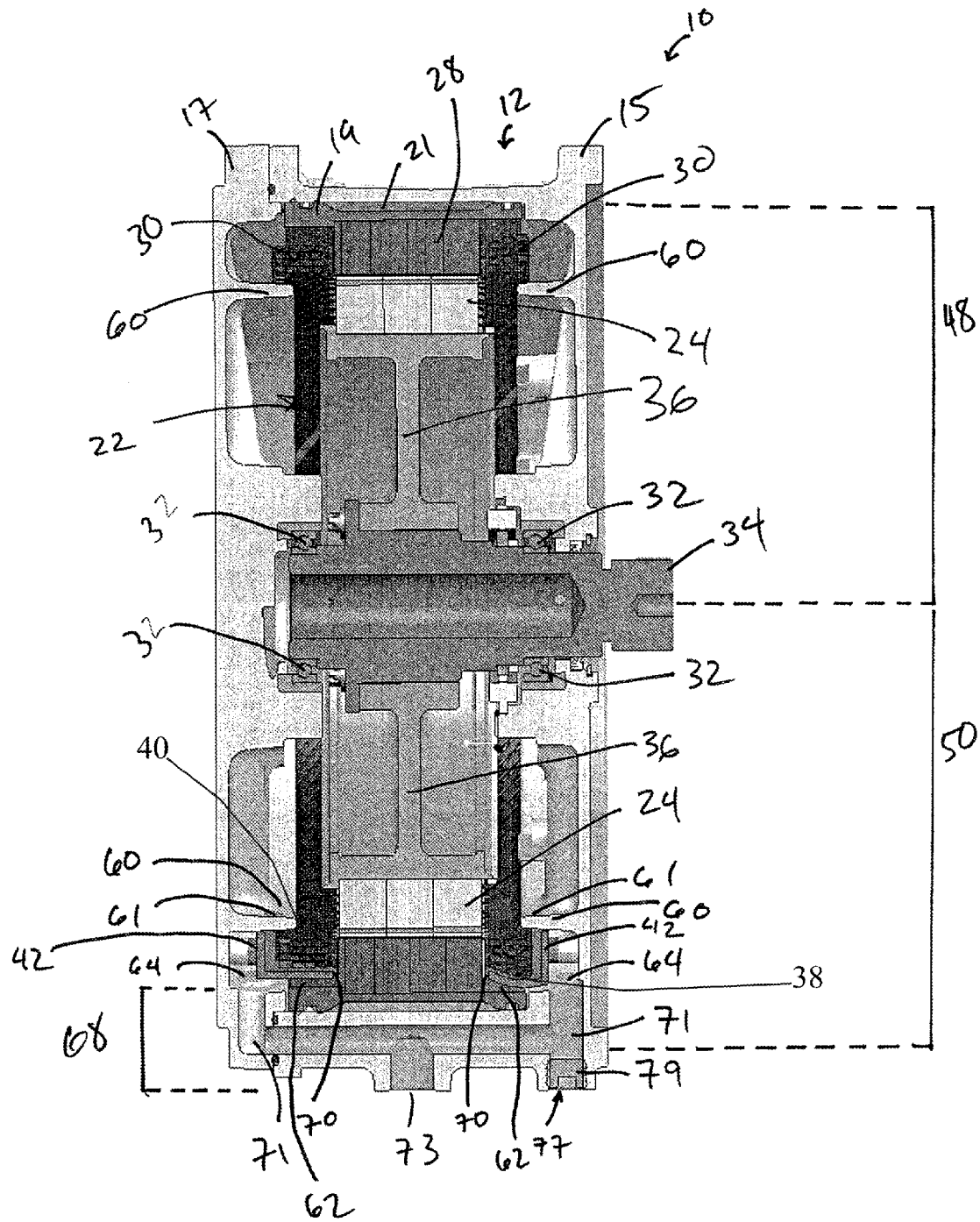
FIG. 7 is a cross-sectional view of the electric machine module of FIG. 3 along line B-B.
Figure 8:
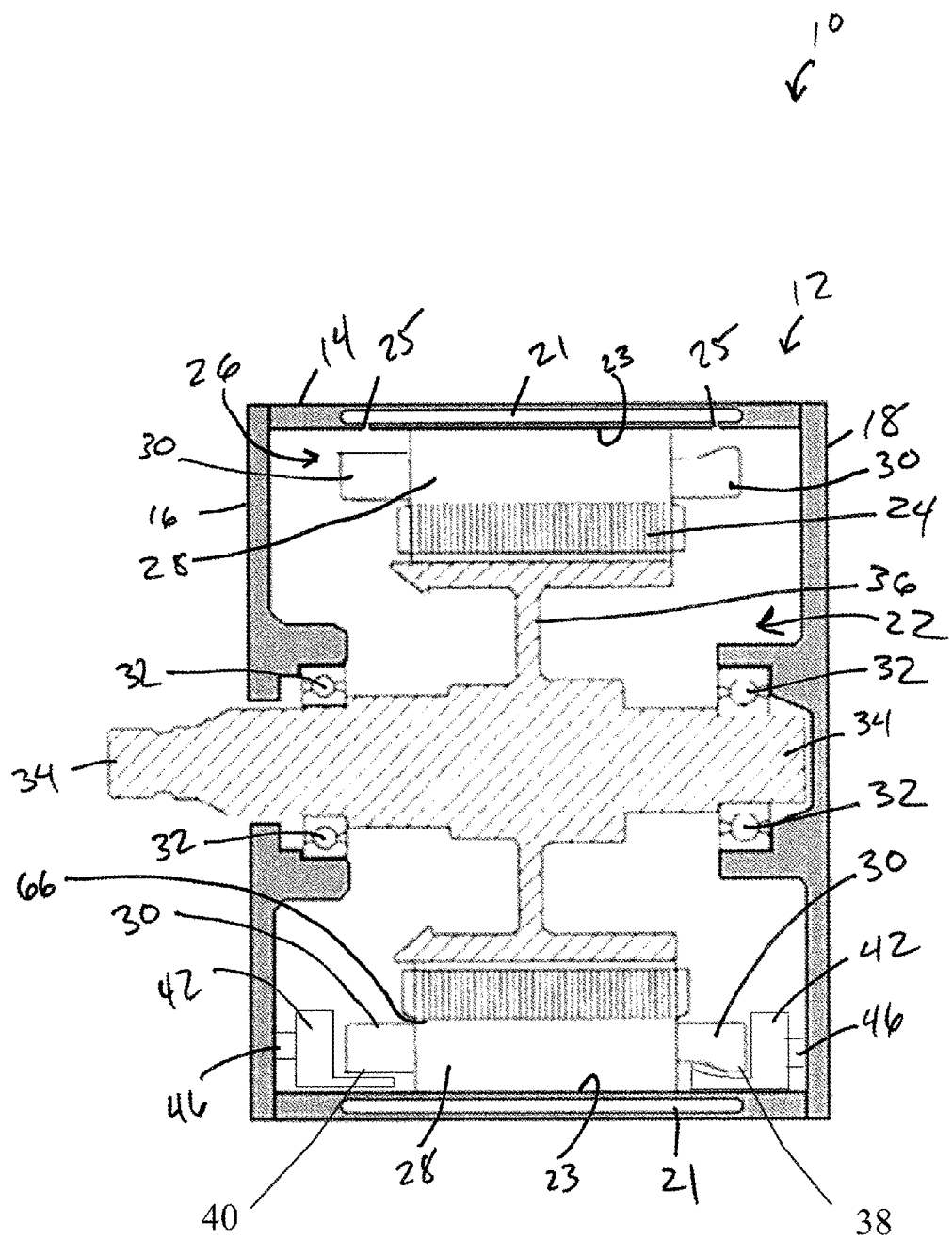
FIG. 8 is a partial front cross-sectional view of an electric machine module according to another embodiment of the invention.

FIGS. 4-7 illustrate portions of the electric machine module 10 according to one embodiment of the invention. The housing 12 can comprise a substantially enclosed, substantially cylindrical canister 15 and a single end cap 17. An electric machine 20 can be housed within a machine cavity 22 at least partially defined by the canister 15 and the end cap 17. The housing 12 can substantially circumscribe, and a least partially enclose, the electric machine 20. In other embodiments, as shown in FIG. 8, the housing 12 can comprise a sleeve member 14, a first end cap 16, and a second end cap 18. For example, the sleeve member 14 and the end caps 16, 18 or the end cap 17 and the canister 15 can be coupled via fasteners 11 or another suitable coupling manner, to enclose the electric machine 20 within the machine cavity 22.

The electric machine 20 can include a rotor 24, a stator assembly 26 comprising a stator 28 and stator end turns 30, and bearings 32, and can be disposed about a main output shaft 34. As shown in FIGS. 4-8, the stator assembly 26 can circumscribe the rotor 24. In some embodiments, the electric machine 20 can also include a rotor hub 36 or can have a "hub-less" design (not shown). Further, in some embodiments, the housing 12 can be divided into generally two regions: a generally upper region 48 and a generally lower region 50. The generally upper region 48 can include a region positioned substantially above the main output shaft 34 and the generally lower region 50 can include a region positioned substantially below the main output shaft 34.

In some embodiments, as shown in FIG. 6-10, the housing 12 can include a coolant jacket 21. The coolant jacket 21 can substantially circumscribe or at least partially surround a portion of the stator assembly 26 and can contain a coolant such as oil, hydraulic fluid oil, antifreeze, motor oil, transmission oil, or a similar fluid. The coolant jacket 21 can be in fluid communication with a fluid source (not shown) containing the coolant. The coolant can be pressurized as it enters the coolant jacket 21 so that it can be circulated through the coolant jacket 21. Heat energy generated by the electric machine 20 can be transferred to the coolant as it is circulated through the coolant jacket 21, which can, in part, lead to electric machine 20 cooling. As shown in FIG. 6, in some embodiments, the coolant can be introduced into the coolant jacket 21 via a coolant inlet 27. In some embodiments, the coolant inlet 27 can be positioned in the generally lower region 50 of the housing 12.

In some embodiments, the coolant jacket 21 can be formed within the sleeve member 14 or the canister 15 where a radially innermost wall 23 of the housing 12 (e.g., of the sleeve member 14 or the canister 15) can substantially separate the coolant jacket 21 from the machine cavity 22. In some embodiments, as shown in FIGS. 6 and 7, the housing 12 can include an internal sleeve member 19. In such embodiments, the coolant jacket 21 can be defined between the internal sleeve member 19 and the sleeve member 14 or the canister 15. More specifically, the internal sleeve member 19 can form the inner wall 23 substantially separating the coolant jacket 21 and the machine cavity 22. In some embodiments, for example, the internal sleeve member 19 can be a stainless steel ring into which the stator 28 can be installed or pressed.

As shown in FIGS. 6 and 7, in some embodiments, the stator end turns 30 can comprise twist end stator end turns 38 and weld end stator end turns 40. The twist end stator end turns 38 and the weld end stator end turns 40 can be positioned at substantially opposite axial ends of the stator assembly 26.

The electric machine 20 can be, without limitation, an electric motor, such as a hybrid electric motor, an electric generator, or a vehicle alternator. In one embodiment, the electric machine 20 can be a High Voltage Hairpin (HVH) electric motor for use in a hybrid vehicle. In yet another embodiment, the electric machine 20 can be an interior permanent magnet (IPM) electric machine for use in a hybrid vehicle.

Components of the electric machine 20 such as, but not limited to, the stator assembly 26 and the rotor 24 can generate heat during operation of the electric machine 20. These components can be cooled to enhance the performance of and increase the lifespan of the electric machine 20.

Figure 11:
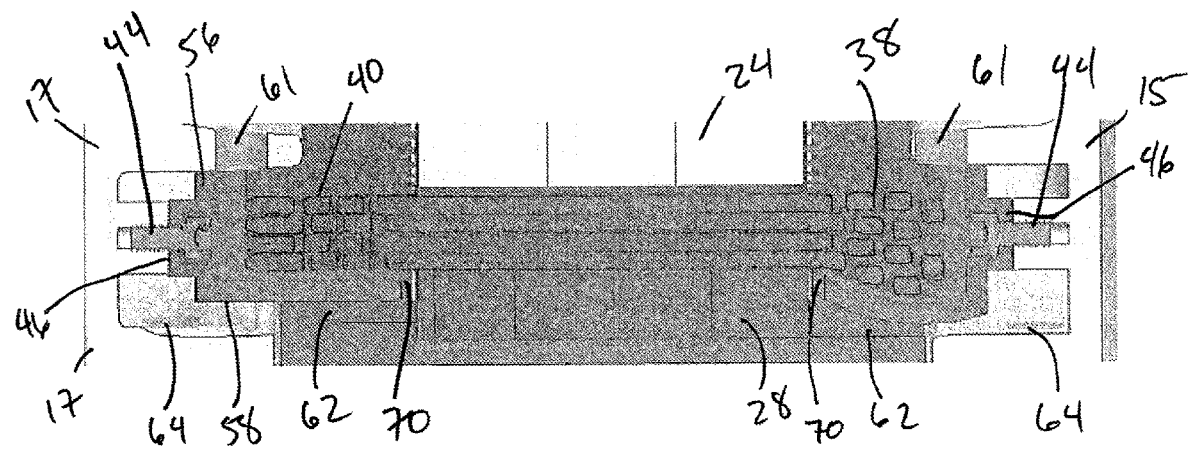
FIG. 11 is a partial front cross-sectional view of an electric machine module according to another embodiment of the invention.
Figure 12:
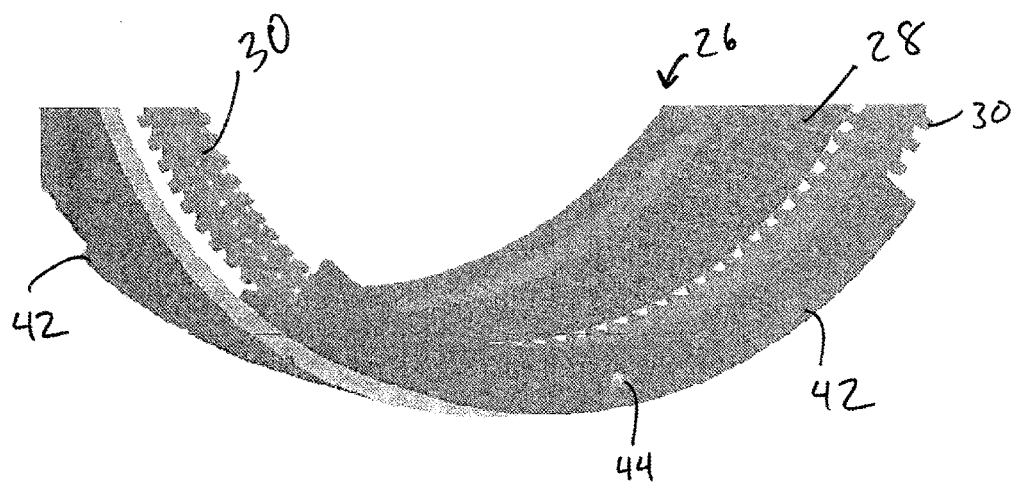
FIG. 12 is a partial perspective view of a stator assembly and baffles of the electric machine module of FIG. 11.
Figure 13:
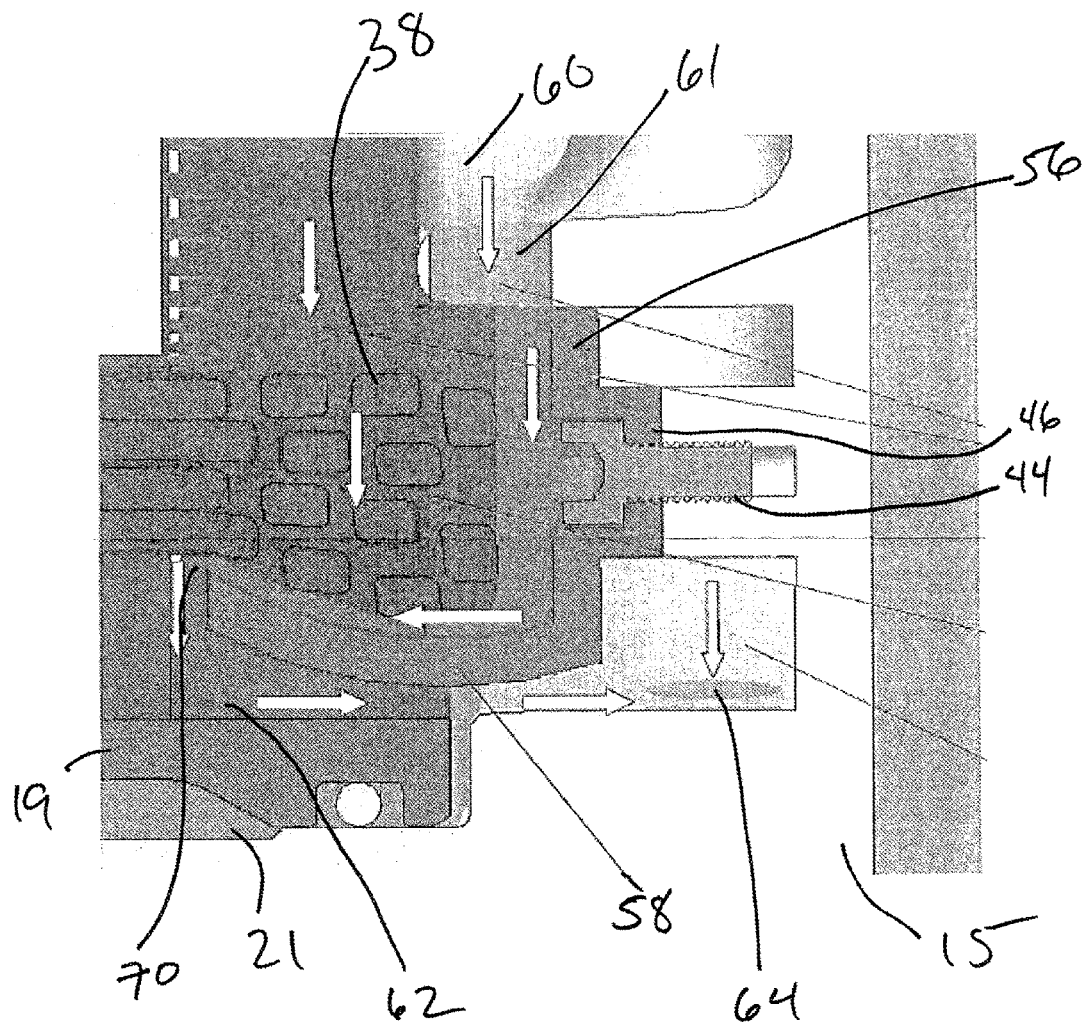
FIG. 13 is a partial front cross-sectional view stator end turns and a baffle of the electric machine module of FIG. 11.
Figure 14:
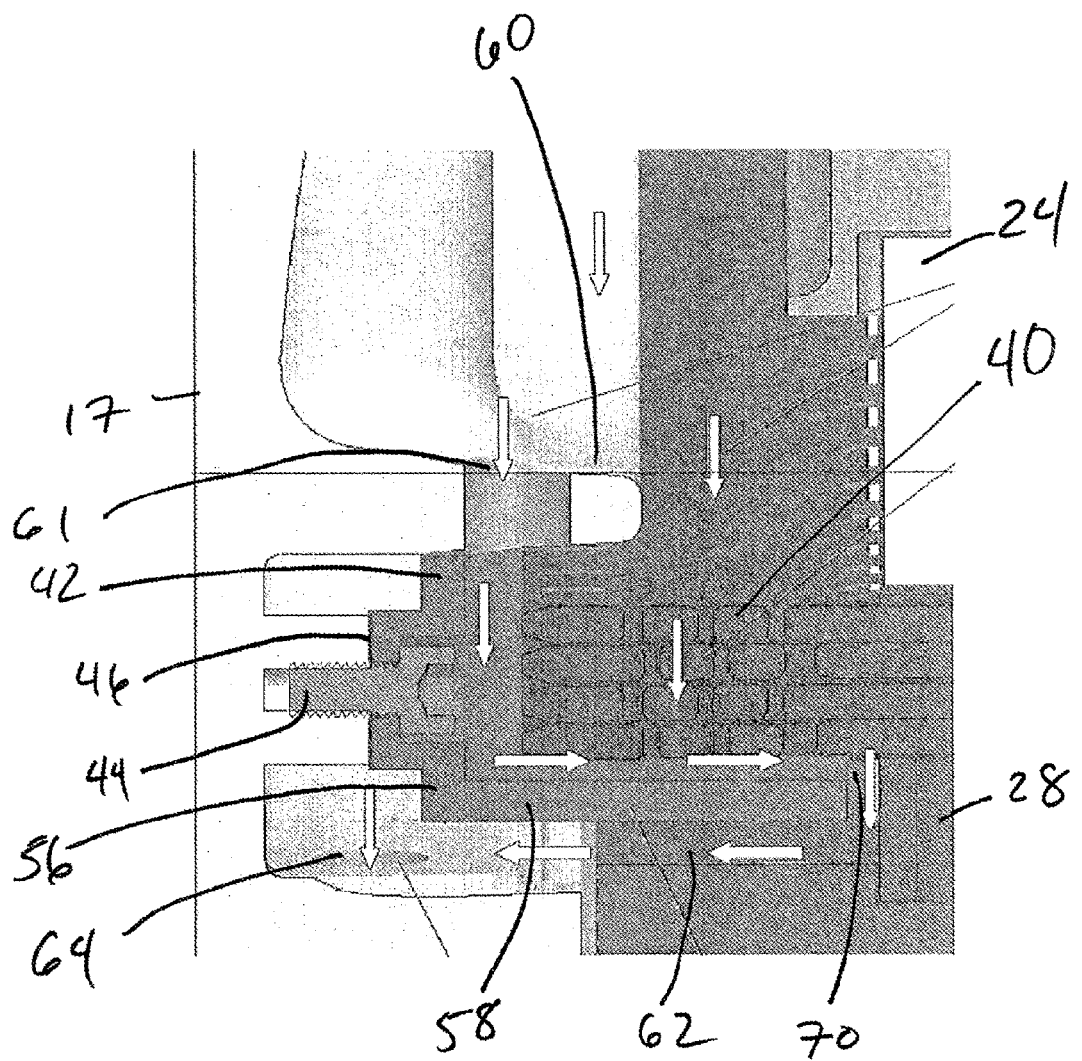
FIG. 14 is another partial front cross section view of stator end turns and a baffle of the electric machine module of FIG. 11.
Figure 15:
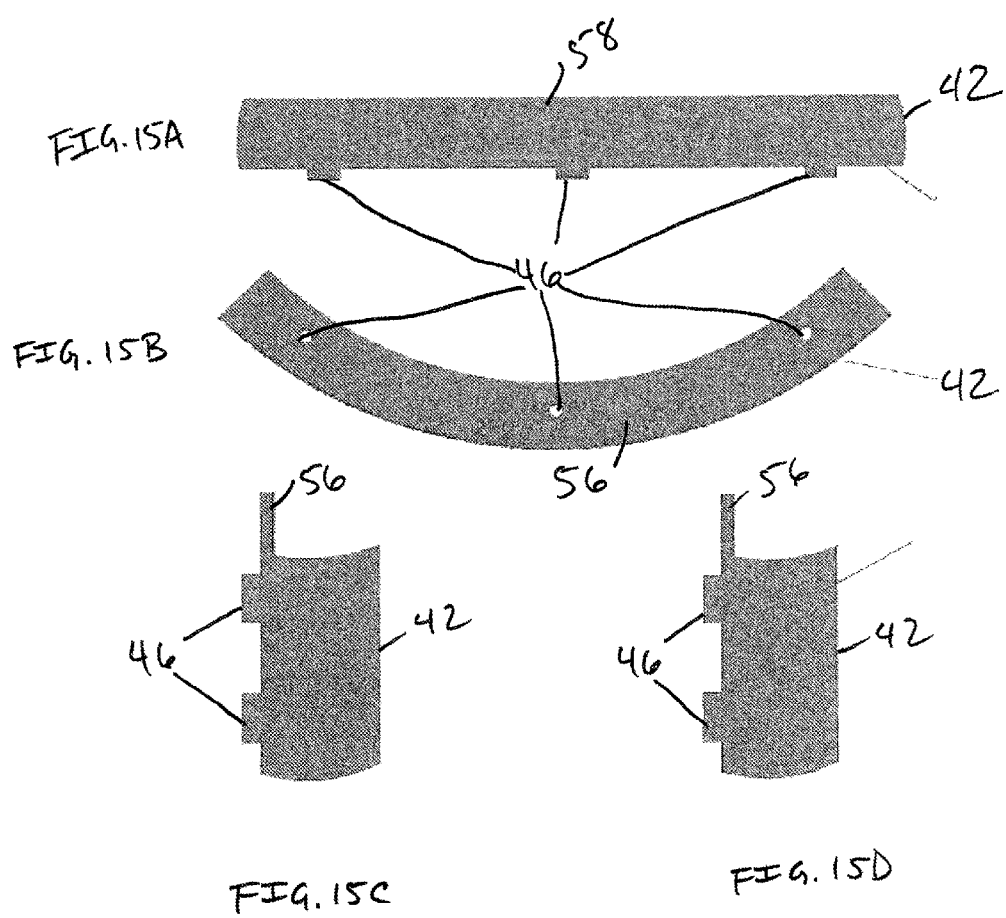
FIG. 15A is a top view of a baffle of the electric machine module of FIG. 11.
FIG. 15B is a side view of the baffle of FIG. 15A.
FIG. 15C is a front view of the baffle of FIG. 15A.
FIG. 15D is a front cross-sectional view of the baffle of FIG. 15A.

As shown in FIGS. 6-8, in some embodiments, one or more baffles 42 can be coupled to the housing 12. In some embodiments, the baffles 42 can be coupled to the housing 12 using threaded fasteners 44, as shown in FIGS. 11, 13 and 14, or other fasteners, adhesives, or other suitable coupling methods. In some embodiments, the baffles 42 can include one or more coupling structures 46. Any type of coupling apparatus can be inserted through the coupling structure 46 to couple the baffles 42 to the housing 12, as shown in FIGS. 15A-15D. The coupling structures can include the threaded fasteners 44, other fasteners, adhesives, or other suitable coupling methods. Further, in some embodiments, the baffles 42 can be substantially formed from a non-conductive material, or another suitable material which can be compatible with heat energy produced by the electric machine and substances introduced into the machine cavity 22, such as the coolant. In some embodiments, the non-conductive material can comprise glass, ceramic, a polymer, such as plastic, another suitable non-conductive material, or combinations thereof.

According to some embodiments of the invention, the baffles 42 can be comprised of multiple units or a substantially single unit. For example, the baffles 42 can be comprised of a vertical subunit 56 and a horizontal subunit 58. In some embodiments, the vertical subunit 56 can be oriented substantially perpendicular with a horizontal axis of the main output shaft 34 and the horizontal subunit 58 can be oriented substantially parallel to the horizontal axis of the main output shaft 34. Also, the horizontal subunit 58 can extend axially inward toward the stator assembly 26, as shown in FIGS. 13 and 14. Further, in some embodiments, the two subunits 56, 58 can be two different pieces coupled together using threaded fasteners, an adhesive, or another suitable manner. In other embodiments, the two subunits 56, 58 can be fabricated (e.g., by a molding process or other suitable process) so that the two pieces are produced substantially as a single unit.

Further, in some embodiments, the baffles 42 can comprise a generally curved, angled, or bent shape to substantially follow the shape of the generally circular-shaped stator assembly 26, as shown in FIGS. 15A-15D. In other embodiments, the baffles 42 can comprise other shapes and configurations to meet manufacturer and user needs.

Referring to FIGS. 6-8 and 10-14, in some embodiments, the baffles 42 can be coupled to the housing 12 generally near the stator end turns 30. When coupled to the housing 12, the baffles 42 can surround a portion of a perimeter of the stator end turns 30. In some embodiments, the vertical subunits 56 of the baffles 42 can be coupled to one or both of the end caps 16, 18 (or the end cap 17 and the canister 15), or another suitable region of the housing 12. In some embodiments, the baffles 42 can be coupled to the housing 12 generally near the stator end turns 30 in can be positioned within the housing 12 in the generally upper region 48 and/or the generally lower region 50. For example, in one embodiment, the baffles 42 can be positioned substantially within the generally lower region 50, as shown in FIGS. 6-8 and 10-14. In addition, the baffles 42 can be positioned so that at least a portion of the baffles 42 can be located near a bottom-most area of the stator assembly 26 and stator end turns 30 (i.e., the "6 o'clock" position). As a result of being formed from substantially non-conductive materials, the baffles 42 can be positioned closer to the stator end turns 30 in comparison to baffles 42 formed from conductive materials because the non-conductive composition only minimally impacts the electrical dynamics of the electric machine 20, if at all.

As shown in FIGS. 13 and 14, in some embodiments, the horizontal subunits 58 can be adaptively configured to closely conform to the size, dimensions, and shape of the electric conductors of the stator end turns 30. For example, the horizontal subunits 58 can be curved, angled, or bent to accommodate the electrical conductors of the twist end stator end turns 38. In another example, the horizontal subunits 58 can be substantially planar, flat, or straight to accommodate the weld end stator end turns 40. In some embodiments, baffles 42 including generally planar horizontal subunits 58 can be positioned near to the twist end stator end turns 38, and baffles including the generally curved horizontal subunits 58 can be positioned near to the weld end stator end turns 40. Additionally, the baffles 42 can include other configurations, shapes, and/or designs, for example, to achieve the manufacturer's and end user's desired outcomes.

Figure 9:
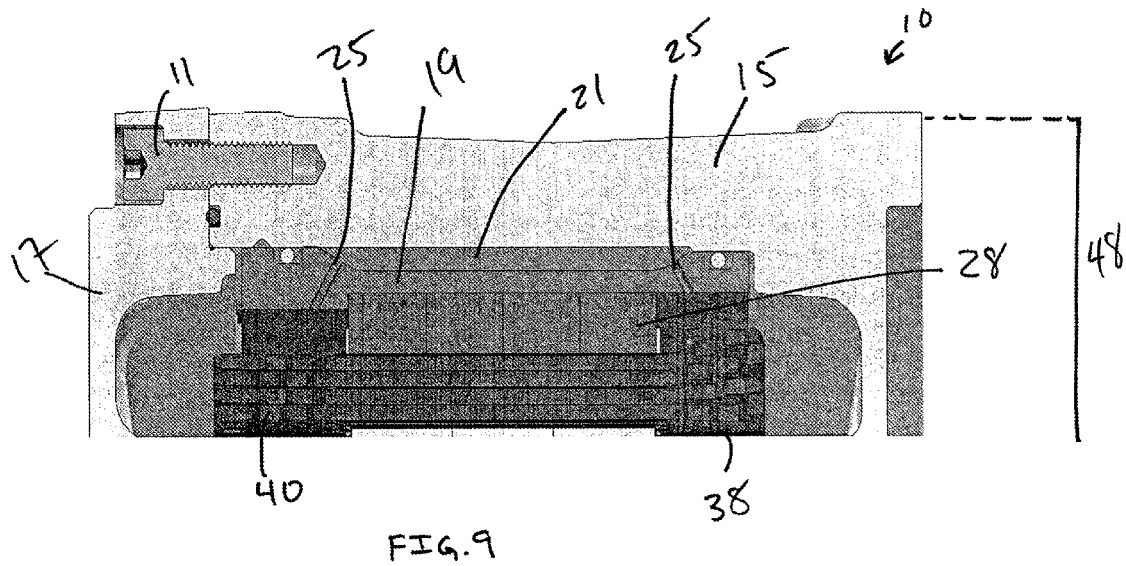
FIG. 9 is a partial front cross-sectional view of the electric machine module of FIG. 3 along line C-C.
Figure 10:
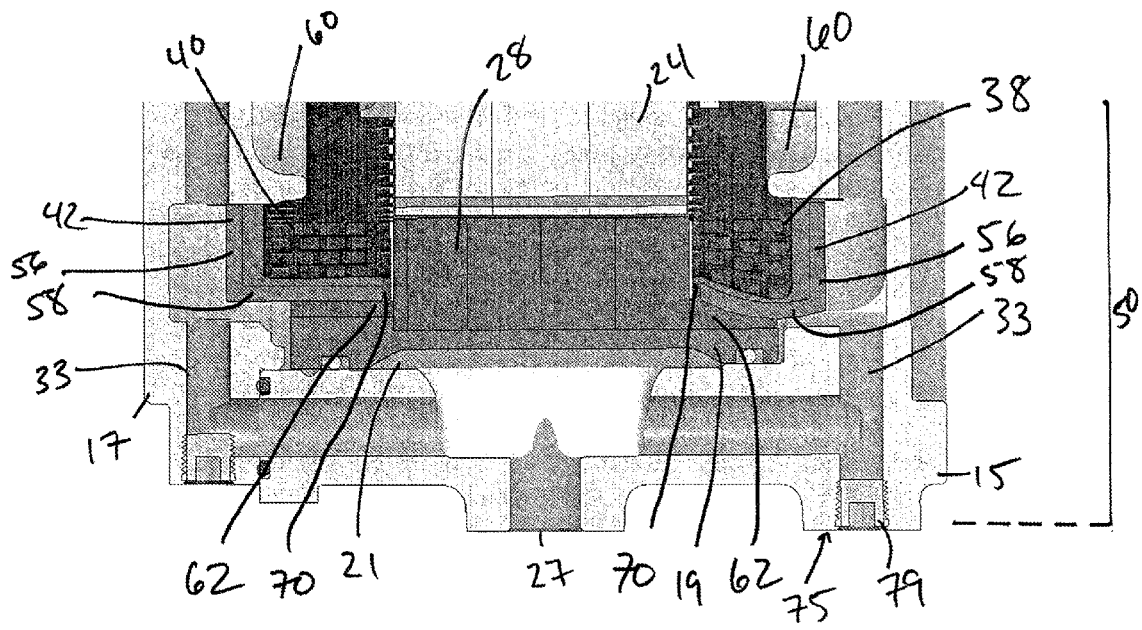
FIG. 10 is a partial front cross-sectional view of the electric machine module of FIG. 6.

According to some embodiments of the invention, the coolant circulating through the coolant jacket 21 can be sprayed or dispersed into the machine cavity 22 from a plurality of coolant apertures 25 extending through at least one of the inner wall 23, as shown in FIG. 9. In some embodiments, the inner wall 23 can include about seven coolant apertures 25. In other embodiments, more or less than seven coolant apertures 25 can be included. The plurality of coolant apertures 25 can be in fluid communication with, at least, the machine cavity 22 and the coolant jacket 21. In some embodiments, the plurality of coolant apertures 25 can be axially located along the housing 12 substantially adjacent to the stator end turns 30 (e.g., located near both axial ends of the housing 12). As a result, the coolant can be dispersed from the coolant jacket 21, through the plurality of coolant apertures 25, and at least partially onto or around the stator end turns 30. The dispersed coolant can receive heat energy from the stator end turns 30, which can result in at least partial cooling of the electric machine 20. In some embodiments, the plurality of coolant apertures 25 can be circumferentially located around the generally upper region 48 of the housing 12. In other embodiments, the plurality of coolant apertures 25 can be circumferentially positioned entirely around a circumference of the housing 12.

In some embodiments, in addition to the plurality of coolant apertures 25, an additional volume of coolant can be expelled near the rotor hub 36 (not shown), for example, from a base of the rotor hub 36 or from the main output shaft 34. As shown in FIG. 6, after passing through the coolant inlet 27, in some embodiments, a portion of the coolant can flow through coolant inlet piping 33 so that some of the coolant can be expelled near the rotor hub 36. The coolant expelled from the rotor hub 36 can flow radially outward toward the housing 12 and the stator assembly 26 (e.g., because of centrifugal force). This additional volume of coolant can further aid in cooling the electric machine 20, including the stator assembly 26.

In some embodiments, after the coolant is introduced into the machine cavity 22, gravity can aid in drawing at least a portion of the coolant in a generally downward direction. As the coolant flows in the generally downward direction, it can aid in cooling the electric machine 20 by receiving and removing at least a portion of the heat energy produced by the electric machine 20. As the coolant flows generally downward, some of the coolant can flow down along the electric machine 20 and/or housing 12, which can lead to further cooling of the electric machine module 10. For example, in some embodiments, at least a portion of the coolant can flow across an outside diameter and/or an inside diameter of the stator end turns 30 to at least partially aid in cooling the electric machine 20.

In some embodiments, the housing 12 can include coolant guides 60. In some embodiments, the coolant guides 60 can comprise generally raised ridges, ledges, troughs, shrouds, ribbed structures, and other similar features, which can axially and/or radially extend from the end caps 16, 18 and the sleeve member 14, the end cap 17 and the canister 15, or other suitable locations on or within the housing 12 into the machine cavity 22. As some of the coolant flows generally downward, the coolant can be guided or directed along an interior surface of the housing 12 by the coolant guides 60. In some embodiments, the coolant guides 60 can be formed so that the coolant guides 60 are integral with elements of the housing 12. In other embodiments, the coolant guides 60 can coupled to the housing 12 using any of the previously mentioned coupling techniques.

Additionally, in some embodiments, the housing 12 can include coolant guide drains 61. In some embodiments, the coolant guide drains 61 can be positioned substantially near the baffles 42 so that at least a portion of the coolant being guided by the coolant guides 60 can be guided, directed, drained, or aimed toward the baffles 42. In some embodiments, the coolant guide drains 61 can be located through the coolant guides 60 at intervals so that as the coolant flows along the coolant guides 60, the coolant can flow through the drains 61 to more quickly flow toward the generally lower region 50. In some embodiments, the coolant guide drains 61 can comprise a generally tube-like configuration defined through a portion of the coolant guides 60, the end caps 16, 18 and the sleeve member 14, the end cap 17 and the canister 15, or another element of the housing 12 to aid in funneling the coolant toward the baffles 42, as shown in FIGS. 11, 13, 14, and 17. In other embodiments, the coolant guide drains 61 can comprise other configurations and shapes, for example, as required by the manufacturer or end user.

In some embodiments, the baffles 42, which can be positioned within the generally lower region 50, as previously mentioned, can further enhance cooling of the electric machine 20. For example, in some embodiments, as the coolant flows generally downward, portions of the coolant can flow over the inner diameter of the stator end turns 30, can flow through the electric conductors of the stator end turns 30, can flow around the perimeter of the stator end turns 30, and can flow around the outside diameter of the stator end turns 30, as shown by the arrows in FIGS. 13 and 14. In some embodiments, due to of inclusion of the baffles 42, some of the coolant can be concentrated around and/or near the stator end turns 30 which can provide enhanced cooling relative to conventional electric machine modules which do not include baffles, or do not include baffles in a generally lower region.

As shown in FIGS. 13 and 14, in some embodiments, the baffles 42 can include baffle outlets 70. In some embodiments, the baffle outlets 70 can be at least partially comprised of a portion of the perimeter of the stator end turns 30 and the horizontal subunits 58. More specifically, the baffle outlets 70 can be positioned at a substantially axially inward-most area of the baffles 42 so that as the coolant flows downward, a portion of the coolant can pool near and around the baffle 42 and some of the coolant can flow through the baffle outlets 70.

Figure 17:
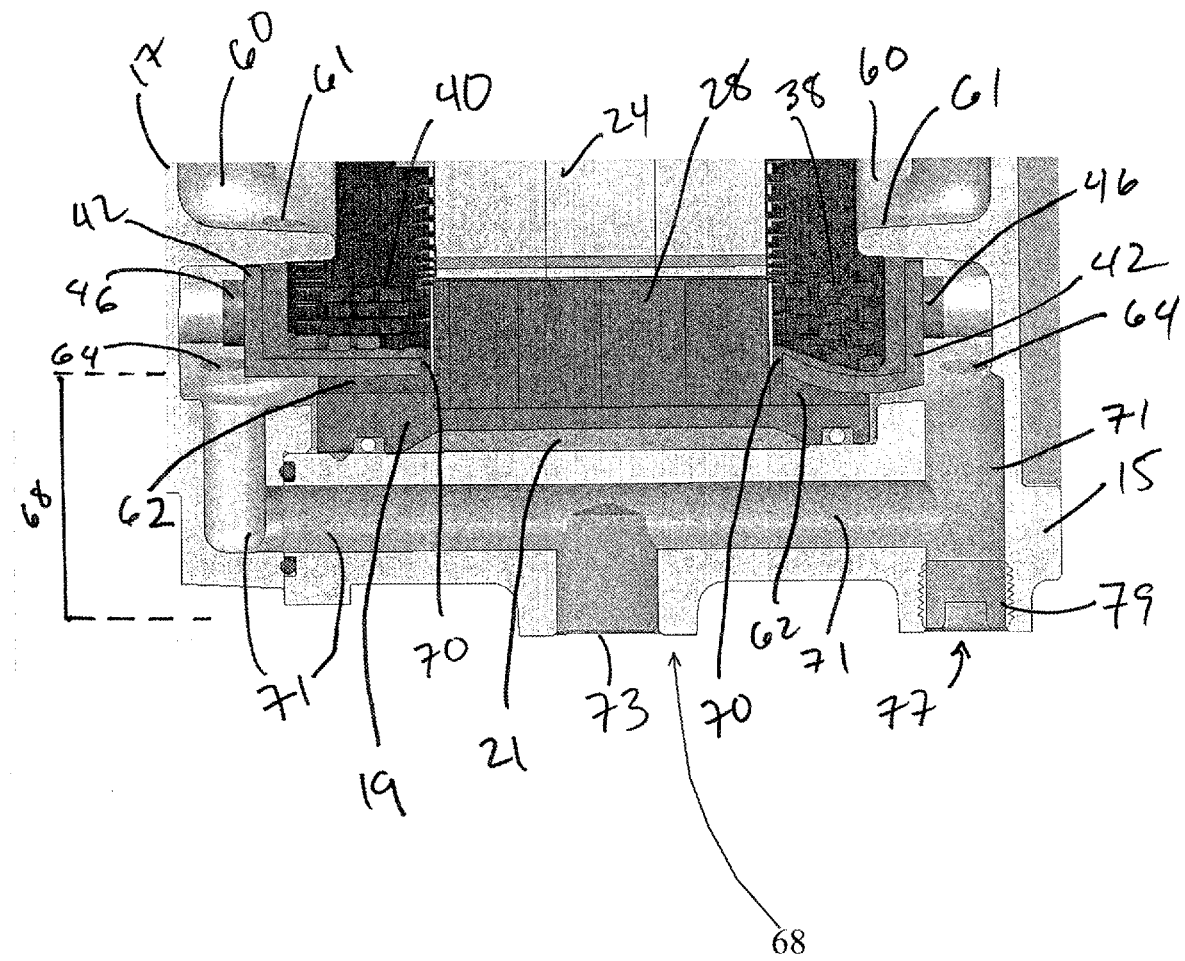
FIG. 17 is a partial front cross-sectional view of the electric machine module of FIG. 7.

As shown in FIGS. 13, 14, and 17, in some embodiments, at least one coolant channel 62 can be included in the electric machine module 10, although more than one coolant channel 62 can be included. In some embodiments, coolant channels 62 can be at least partially comprised of the baffles 42, the stator assembly 26, and portions of the housing 12, including but not limited to the inner wall 23, the end caps 16, 18 and the sleeve member 14, and/or the end cap 17 and the canister 15. More specifically, some of the coolant which can flow through the baffle outlets 70 can be guided through the coolant channels 62. As a result, in some embodiments, at least a portion of the coolant reaching the baffles 42 and the stator end turns 30 can be guided through the baffle outlets 70 to the coolant channels 62 near and around the stator assembly 26, which can at least partially aid in cooling. In some embodiments, a substantially constant flow of coolant can pass over and through the baffles 42 and the stator assembly 26, including the stator end turns 30 in the generally lower region 50 of the housing 12 and flow through the baffle outlets 70 to the coolant channels 62. This configuration can aid in reducing the presence of excess heat energy and can help improve cooling to the electric machine 20 components in the generally lower region 50.

Also, in some embodiments of the invention, one or more coolant outlets 64 can be included in the electric machine module 10. In some embodiments, the coolant outlets 64 can be apertures defined through portions of the housing 12, such as the end caps 16, 18 and the sleeve member 14, or the end cap 17 and the canister 15. In some embodiments, the coolant outlets can be formed through portions of the generally lower region 50 of the housing 12 at substantially opposite axial ends of the housing 12, as shown in FIG. 17. The coolant outlets 64 can serve as drains for coolant introduced into the electric machine module 10, and in some embodiments, can be located near or within a portion of the coolant channels 62. For example, at least some of the coolant flowing within the coolant channels 62 can be directed toward the coolant outlets 64, as shown in FIGS. 13 and 14.

Figure 16:
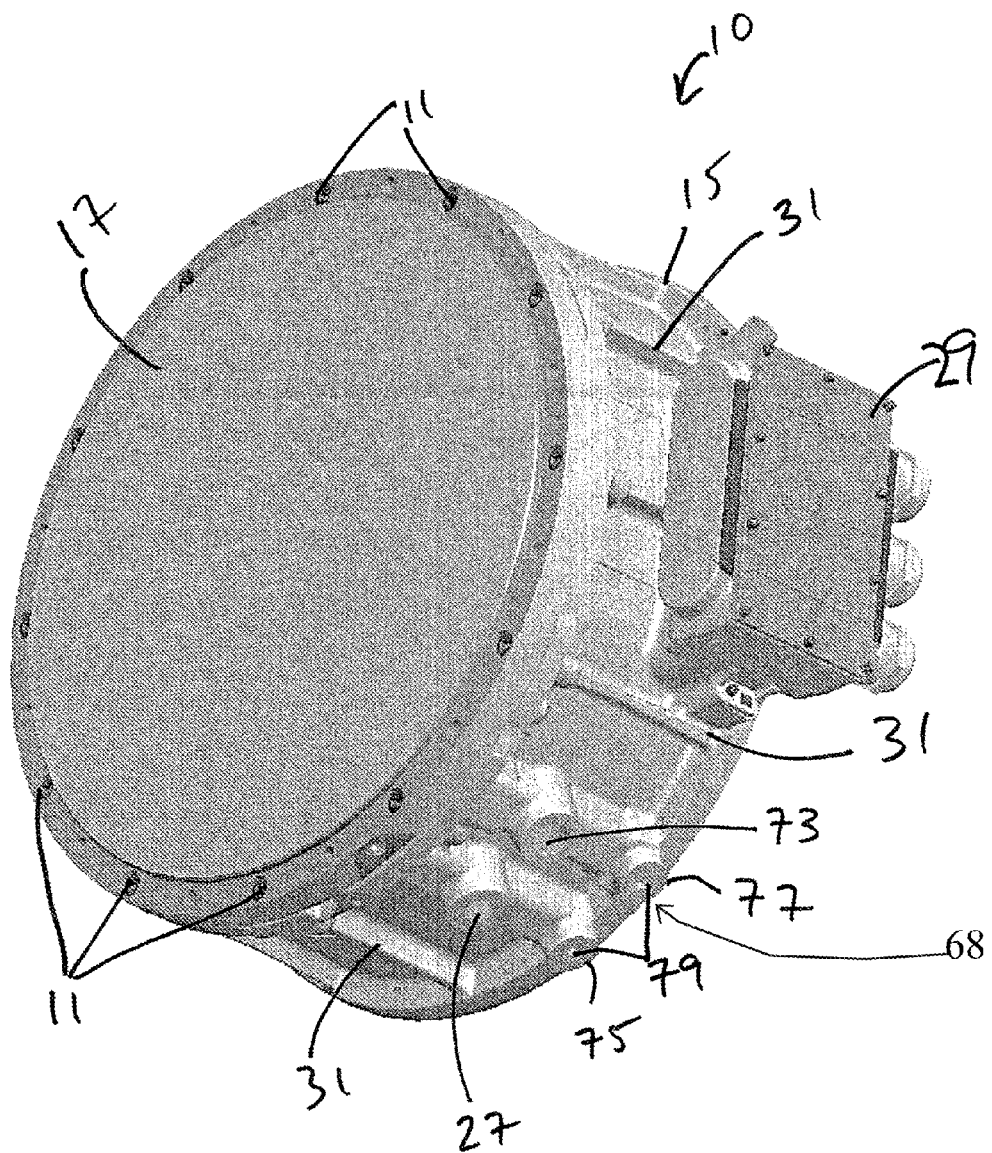
FIG. 16 is a perspective view of the electric machine module of FIG. 1.

Referring to FIGS. 6, 16, and 17, in some embodiments, the electric machine module 10 can include a sump system 68. In some embodiments, the sump system 68 can include sump piping 71, a sump outlet 73, and a sump area (not shown). The sump piping 71 can be in fluid communication with the coolant outlets 64 so that a portion of the coolant flowing through the coolant outlets 64 can be dispersed through the sump piping 71 and the sump outlet 73 and into the sump area. In some embodiments, the sump area can serve as a reservoir for coolant after it flows over the machine cavity 22. In some embodiments, the sump area can be fluidly connected to a heat exchange element, such as a radiator or similar feature so that the coolant can be circulated to the heat exchange element where a portion of the heat energy carried by the coolant can be removed and the coolant can be re-circulated to the module 10.

Also, as shown in FIG. 16, in some embodiments, the module 10 an auxiliary inlet 75 and an auxiliary outlet 77. The auxiliary inlet 75 and the auxiliary outlet 77 can be used for applications where increased coolant flow into and out the module 10 could be desired by the manufacturer and/or end user. In some embodiments, when the auxiliary inlet 75 and the auxiliary outlet 77 are not generally required for module operation 10, they can be substantially sealed with plugs 79.

Additionally, in some embodiments of the invention, the inclusion of baffles 42 can eliminate or reduce the need for maintaining a coolant pool at the bottom of the housing 12 and can simplify the flow control of the coolant. In some conventional electric machine modules, the coolant pool can be an important feature because it can aid in the cooling of the stator assembly 26 and the stator end turns 30 (i.e., the pool can rise high enough so that the coolant can contact the stator end turns 30). The coolant pool also can cause difficulties in electric machine module operation, for example by causing flooding of an air gap 66 between the stator assembly 26 and the rotor 24, which can interrupt operation of the electric machine 20. As a result, it can be necessary to carefully regulate flow rates of coolant entering and exiting the module to avoid flooding the air gap 66. The inclusion of the baffles 42 in some embodiments of the invention can eliminate the need for the coolant pool because at least some of the coolant is still exposed to some of the heat energy-producing portions of the electric machine 20, but in a more directed manner relative to the coolant pool because a portion of the coolant can be concentrated around the stator assembly 26. Also, coolant can be allowed to pass rapidly through the coolant channels 62 and can drain into the sump system 68, which can further negate the need for a coolant pool so that, in some embodiments, careful regulation of the flow rates can be unnecessary or minimally necessary.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
   an electric machine including a stator assembly, the stator assembly including stator end turns;
   a housing at least partially enclosing the electric machine, the housing at least partially defining a machine cavity;
   a plurality of coolant apertures in fluid communication with at least a portion of the machine cavity, the plurality of coolant apertures axially positioned along the housing substantially adjacent to the stator end turns and configured and arranged to disperse liquid coolant onto the stator end turns; and
   at least one baffle coupled to the housing at a region near the stator end turns,
   the at least one baffle surrounding a portion of a perimeter of the stator end turns substantially adjacent to both the outer diameter and axial end of the stator end turns and extending axially inward towards the stator assembly and terminating substantially at the inner diameter of the stator end turns; and
   wherein the at least one baffle is configured and arranged to enable a liquid coolant to flow over the stator end turns between the at least one baffle and the portion of the perimeter of the stator end turns substantially adjacent to both the outer diameter and axial end of the stator end turns, and extending axially inward towards the stator assembly and terminating substantially at the inner diameter of the stator end turns; and wherein the at least one baffle is configured and arranged to enable a liquid coolant to flow axially inwardly along a substantial axial length of the at least one baffle and around the at least one baffle to flow axially outward along a substantial axial length of the at least one baffle in a substantially opposite direction.

2. The electric machine module of claim 1, wherein the at least one baffle includes being formed from a substantially non-conductive material.

3. The electric machine module of claim 2, wherein the substantially non-conductive material includes plastic.

4. The electric machine module of claim 1, wherein the housing includes coolant guides.

5. The electric machine module of claim 1, wherein the at least one baffle, the stator assembly, and the housing substantially form at least one coolant channel.

6. The electric machine module of claim 1, wherein the stator end turns comprise twist end stator end turns and weld end stator end turns; and the at least one baffle comprises two baffles, each of the two baffles include a horizontal subunit, and the horizontal subunits are adaptively configured to conform to the twist end stator end turns and the weld end stator end turns, respectively.

7. The electric machine module of claim 1, wherein the housing includes a coolant outlet.

8. The electric machine module of claim 1, wherein the housing includes a generally lower region, the at least one baffle coupled to the housing substantially within the generally lower region.

9. The electric machine module of claim 8, and further comprising a liquid coolant capable of being dispersed into the machine cavity, wherein at least a portion of the liquid coolant flows generally downward toward the at least one baffle to at least partially aid in cooling the electric machine.

10. The electric machine module of claim 9, and further comprising a sump system, wherein a portion of the liquid coolant flows toward the sump system.

11. An electric machine module comprising:

an electric machine including a stator assembly, the stator assembly including stator end turns;

a housing at least partially enclosing the electric machine, the housing including a generally lower region;

a plurality of coolant apertures axially positioned along the housing substantially adjacent to the stator end turns and configured and arranged to disperse liquid coolant onto the stator end turns; and baffles coupled to the generally lower region of the housing near the stator end turns so that the baffles surround a portion of a perimeter of the stator end turns substantially adjacent to both the outer diameter and axial end of the stator end turns, the baffles also extending axially inward towards the stator assembly and terminating substantially at the inner diameter of the stator end turns adjacent to both the outer diameter and axial end of the stator end turns, and the baffles include being formed from a substantially non-conductive material; and wherein the baffles are configured and arranged to enable a liquid coolant to flow over the stator end turns between the baffles and the portion of the perimeter of the stator end turns substantially adjacent to both the outer diameter and axial end of the stator end turns, and extending axially inward towards the stator assembly and terminating substantially at the inner diameter of the stator end turns; and wherein the baffles are configured and arranged to enable a liquid coolant to flow axially inwardly along a substantial axial length of the baffles and around the baffles to flow axially outward along a substantial axial length of the baffles in a substantially opposite direction.

12. The electric machine module of claim 11, wherein the stator assembly substantially circumscribes a rotor.

13. The electric machine module of claim 11, wherein the stator end turns comprise twist end stator end turns and weld end stator end turns; and wherein each of the baffles include a horizontal subunit; and wherein the horizontal subunits are adaptively configured to conform to the twist end stator end turns and the weld end stator end turns, respectively.

14. The electric machine module of claim 11, wherein the baffles, the stator assembly, and the housing substantially form coolant channels.

* * * * *